US011252117B2

(12) United States Patent
Mukherjee et al.

(10) Patent No.: US 11,252,117 B2
(45) Date of Patent: Feb. 15, 2022

(54) ELECTRONIC COMMUNICATION MESSAGE COACHING SERVICE

(71) Applicant: INTERNATIONAL BUSINESS MACHINES CORPORATION, Armonk, NY (US)

(72) Inventors: Maharaj Mukherjee, Poughkeepsie, NY (US); Jonathan Lenchner, North Salem, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 196 days.

(21) Appl. No.: 16/101,136

(22) Filed: Aug. 10, 2018

(65) Prior Publication Data

US 2020/0053035 A1 Feb. 13, 2020

(51) Int. Cl.
*H04L 12/58* (2006.01)
*G06N 20/00* (2019.01)
*G06F 40/30* (2020.01)
*G06F 40/40* (2020.01)

(52) U.S. Cl.
CPC ............ *H04L 51/12* (2013.01); *G06F 40/30* (2020.01); *G06F 40/40* (2020.01); *G06N 20/00* (2019.01); *H04L 51/046* (2013.01); *H04L 51/32* (2013.01)

(58) Field of Classification Search
CPC ....... H04L 51/12; H04L 51/046; H04L 51/32; G06N 20/00; G06F 17/2785; G06F 17/28
See application file for complete search history.

(56) References Cited

U.S. PATENT DOCUMENTS

| 2004/0093428 | A1* | 5/2004 | Arnold | H04L 67/327 |
| | | | | 709/242 |
| 2016/0063874 | A1* | 3/2016 | Czerwinski | G06Q 10/107 |
| | | | | 434/236 |
| 2016/0065517 | A1* | 3/2016 | Beausoleil | G06Q 10/107 |
| | | | | 709/206 |
| 2016/0294755 | A1 | 10/2016 | Prabhu | |
| 2017/0180294 | A1* | 6/2017 | Milligan | H04L 51/02 |
| 2018/0152402 | A1* | 5/2018 | Tsou | H04L 51/12 |
| 2018/0176168 | A1* | 6/2018 | Tsou | H04L 51/08 |

FOREIGN PATENT DOCUMENTS

EP 2645642 A1 10/2013

OTHER PUBLICATIONS

Anonymous, "System to prevent inappropriate message from being sent out by referring to users' relation," An IP.com Prior Art Database Technical Disclosure, IP.com No. IPCOM000251773D, Dec. 4, 2017 (4 pages).

* cited by examiner

*Primary Examiner* — Patrice L Winder
*Assistant Examiner* — Aye M Aung
(74) *Attorney, Agent, or Firm* — Griffiths & Seaton PLLC

(57) ABSTRACT

Embodiments for implementing an electronic communication coaching service by a processor are disclosed. An appropriateness of a communication may be interpreted prior to a user sending the communication to another party according a plurality of identified contextual factors. The user may be alerted to a possible negative impact of sending the communication to the another party if the interpreted appropriateness is less than a predetermined threshold. A delay in sending the communication may be suggested for a selected period of time to implement one or more suggestive corrective actions to the communication.

17 Claims, 6 Drawing Sheets

ELECTRONIC COMMUNICATION MESSAGE COACHING SERVICE

BACKGROUND OF THE INVENTION

Field of the Invention

The present invention relates in general to computing systems, and more particularly to, various embodiments for implementing an electronic communication coaching service by a processor.

Description of the Related Art

In today's society, consumers, businesspersons, educators, and others communicate over a wide variety of mediums in real time, across great distances, and many times without boundaries or borders. The advent of computers and networking technologies has made possible the intercommunication of people from one side of the world to the other. These computing systems allow for the sharing of information between users in an increasingly user friendly and simple manner. The increasing complexity of society, coupled with the evolution of technology, continues to engender the sharing of a vast amount of information between people.

SUMMARY OF THE INVENTION

Various embodiments for a cognitive system that implements an electronic communication coaching service by a processor, are provided. In one embodiment, by way of example only, a method for implementing an electronic communication message coaching service, again by a processor, is provided. An appropriateness of a communication may be interpreted prior to a user sending the communication to another party according a plurality of identified contextual factors. The user may be alerted to a possible negative impact of sending the communication to the another party if the interpreted appropriateness is less than a predetermined threshold (or alternatively if the interpreted inappropriateness is above a predetermined threshold). A delay in sending the communication may be suggested for a selected period of time to implement one or more suggestive corrective actions to the communication.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
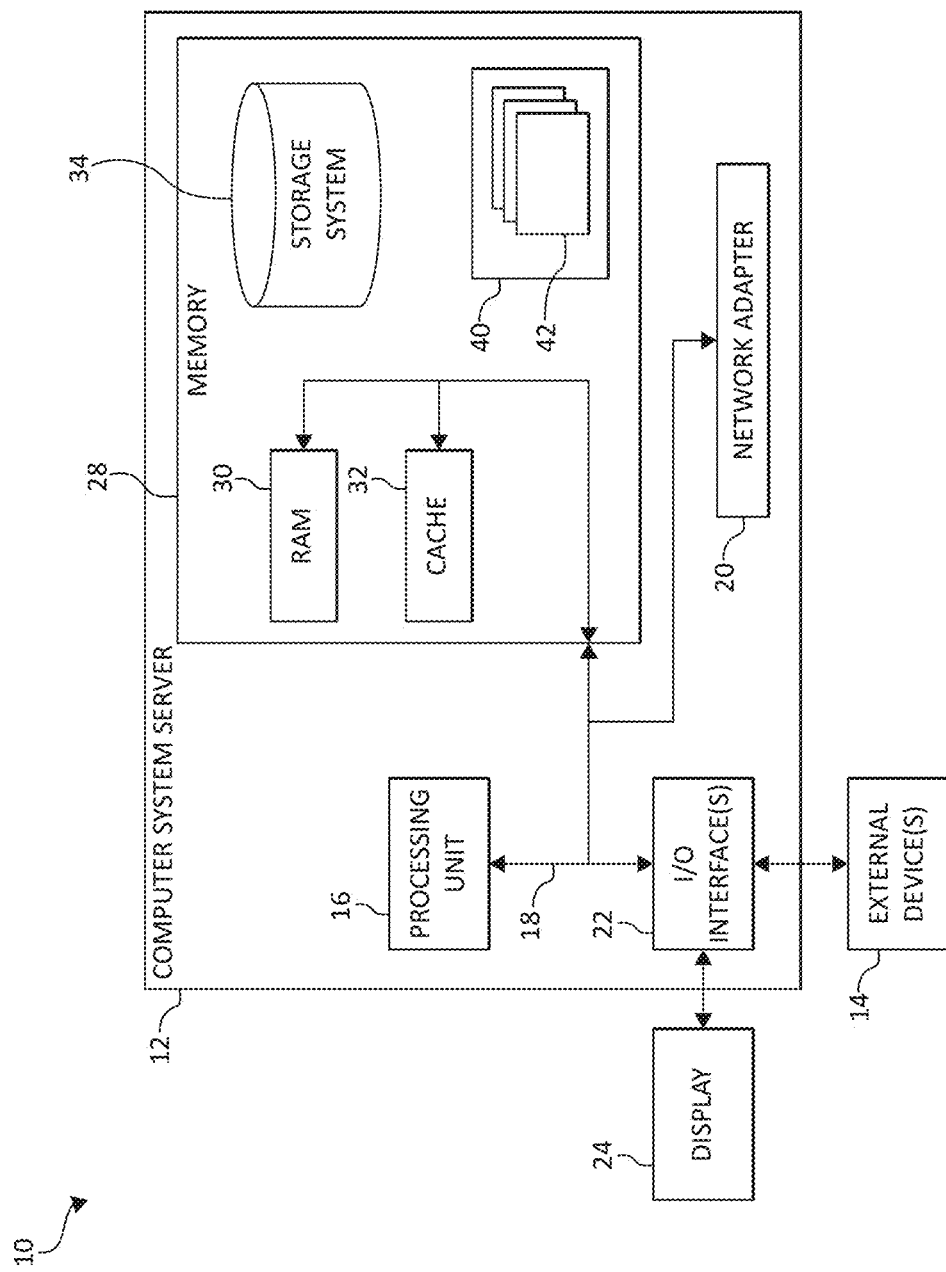
FIG. 1 is a block diagram depicting an exemplary cloud computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, the advent of immediate, real-time communication enables various user equipment ("UE") such as, for example, a computing device/wireless communication device to share communications, such as emails, instant messages, social media posts, and other content. These shared communications may immediately become available in the public domain, and may remain in the public domain potentially indefinitely.

A user sharing communications, such as an email being sent to work associates, must consider the context and implications of each particular shared or sent communication. For example, a manager may have drafted and sent an email to an employee in a tone and etiquette that could be demeaning, inappropriate, or derogatory during a period of time the manager was under a lot of stress. As a result, the manager may end up regretting the sending of the email, wishing the email was never sent. Moreover, people sometimes send electronic communications during times of elevated stress or while upset, and an electronic communications may have an unintended tone. Sometimes electronic communications may contain objectionable material, such as pictures, derogatory or inflammatory words, or inappropriate jokes that may not be palatable to one or more recipients, and in some instances the electronic communications may even be sent by mistake to the wrong people.

Regrettably, some electronic communications sent by a user have negative implications in some scenarios. For example, there are individuals who have lost jobs, while others have faced defamation litigation. In some cases, brands have dropped endorsements of celebrities due to public statements, messages, speeches, or posts, and for sharing communications that were deemed inappropriate.

Accordingly, various embodiments are provided herein for using an electronic communication coaching service. In one aspect, an appropriateness of a communication may be interpreted prior to a user sending the communication to another party according a plurality of identified contextual factors. The user may be alerted to a possible negative impact of sending the communication to the another party/recipient if the interpreted appropriateness is less than a predetermined threshold. For example, an identified word, phrase, or other part of the communication may be highlighted (e.g., highlight content of an email) to alert the user of the possible negative impact upon a one or more recipients. A delay in sending the communication may be suggested for a selected period of time to implement one or more suggestive corrective actions to the communication.

In an additional aspect, an emotional state level (e.g., a level of stress, frustration, annoyance, agitation, anger, sarcasm, happiness, sadness, etc.) may be detected in an electronic communication by identifying and searching for keywords (including potentially inflammatory, derogatory, racially or socially insensitive words), expressions, punctuation, text font, or a combination thereof indicative of the various emotional states of a user or that might otherwise be inappropriate. The sensitivity to the keywords, expressions, punctuation, text font, or a combination thereof may depend on the sender and the recipient and their relationships and history of communication as well as the context. An electronic communication coaching service may alert the user and/or highlight the expression(s) and suggest one or more changes. The electronic communication coaching service may also suggest holding the communication if the user has not accepted the suggested changes. The electronic communication coaching service may even restrict or hold the communication for a selected period of time if the tone and the materials are especially inappropriate, or it recognizes that the inappropriate material in the communication is being sent to a third party (e.g., coworker, colleague, associate, and/or family member).

The electronic communication coaching service, in conjunction with machine learning and other processing characteristics, discern and identify "undesirable communication messages" from one or more contextual factors associated with the communication and keywords (including swear words), expressions, punctuation, text font, or a combination thereof.

In one aspect, the electronic communication coaching service, in conjunction with machine learning and other processing characteristics, detect elevated stress levels in the communication and provide guidance, suggestions, and/or corrections to update, correct, or even hold the communication prior to sending to one or more recipients. Additionally, the electronic communication coaching service, in conjunction with machine learning and other processing characteristics, may detect, before sending an electronic communication, stress level of the electronic communication, such as, for example, an email, a chat message, a social media post, by searching for inappropriate key words and expressions based on sender/recipient profile, relationship between sender and recipient and history of communication. One or more corrections may be suggested in the electronic communication by highlighting content such as, for example, text, images, expressions, email addresses of one or more recipients, and determine if a stress level is below a threshold before sending.

The so-called "appropriateness" of communication, such as an email, may be very subjective and context dependent. The same message may be interpreted and evaluated to be either fine, or "totally improper," or even "illegal" depending on who (subject) says to whom (object), when and where (context). In some cases, lack of cultural and/or social knowledge, or even insufficient linguistic and/or worldly knowledge on the part of the person authoring and/or sending communication may cause irreparable damage.

Consider the following example. A comment in an email by a person to a close friend about his low opinion of his current manager at his company may be appropriate in a private setting between the two friends, such as in a private series of conversations posted inside one of the individual's intranet. However, the same comments about the current manager may be deemed to be disparaging, and perhaps inappropriate, when publicly posted in an email sent via a server of a company's internet.

The foregoing example illustrates that the content of communication itself may not be inappropriate; rather the context of the communication becomes important as questions of to whom the communication is directed, who the communication is from, who may view the communication, where the communication is sent, and when the communication is sent.

It may be acceptable to post, for example, caricatures of a political figure in one country, but in another country, such caricatures may be a criminal offense. Politically sensitive communications may be acceptable in a personal social media page or through personal emails, but may be inappropriate if shared through company forums, conference calls, emails, or using other corporate resources.

Accordingly, the so-called "appropriateness" of a particular communication may depend greatly upon contextual factors, such as a subject-object relationship, and other contextual factors such as visibility of the message to other audiences/groups of people and current socially sensitive topics. A deeper, cognitive analysis of the communication is needed, for example based on standards, rules, and practices in ethical, moral, as well as legal dimensions.

The mechanisms of the illustrated embodiments help to facilitate communications in situations where certain communication may be inappropriate by employing a cognitive analysis using the context of the communication, in addition to other variables such as culture or socially acceptable behavior and communication, country specific laws, a rules system that may be adjusted based on attitude, emotion, type of social network (public/private), the social reach/influence of the parties involved, topic of conversation, impact/potential viral spread of a post across social networks, and the like using machine learning operations. When one or more of these contextual factors is determined to exceed a predetermined threshold of concern, the mechanisms then may alert the user should there be a potentially negative impact/implication to them. In addition, the mechanisms of the illustrated embodiments may also monitor reaction to communications so that weighting of contextual factors, derivation of certain rules, or other calculations may be tailored by the observed feedback.

It should be noted that reference to calculating an 'interpreted appropriateness" against a predetermined threshold herein following may refer to implementations of a wide variety of metric analysis, data analytics, and other data processing as one of ordinary skill in the art will appreciate. For example, a predetermined threshold may be set as a numerical value, where certain kinds of communication are given certain weighted values, and an aggregate number of the weighted values is compared against the numerical threshold value. In other embodiments, a "most significant" aspect of the communication may be selected, given a weight or other metric value, and compared against a bar metric representative of the threshold.

In one embodiment, for example, communications may be organized into certain intensity levels, where a benign form of communication is assigned a lower intensity value, where potentially offensive, insensitive, derogatory (e.g., racially insensitive and derogatory), illegal, or other generally hazardous communication assigned a high intensity value. Here again, the communications may be examined in view of the context in which the communication is made, so that some communication may be assigned a higher intensity value in a certain context and according to a user profile both the sender and recipient(s). One of ordinary skill in the art, however, will appreciate that any number of metrics may be implemented as a "threshold" comparison to accomplish the various aspects of the illustrated embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
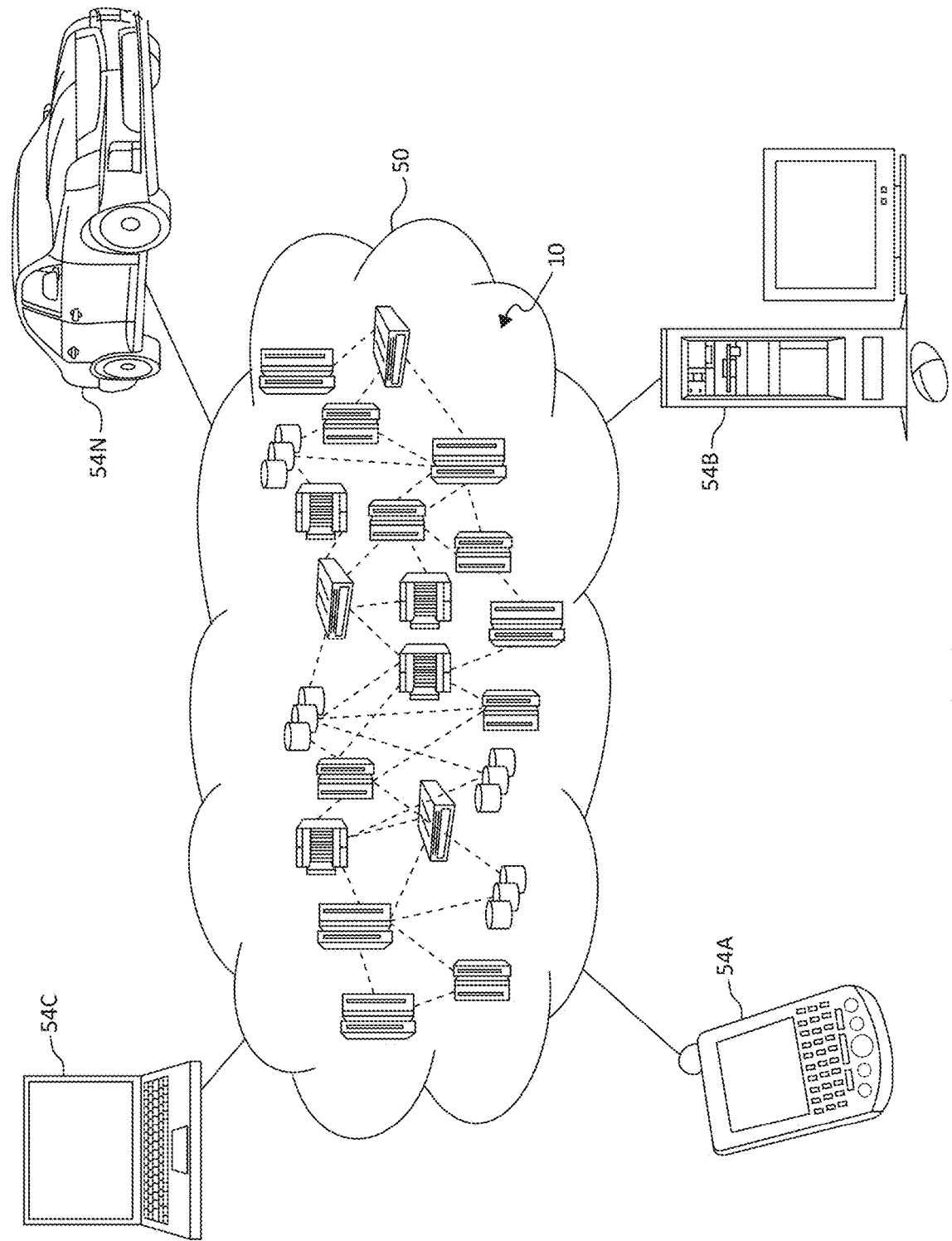
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
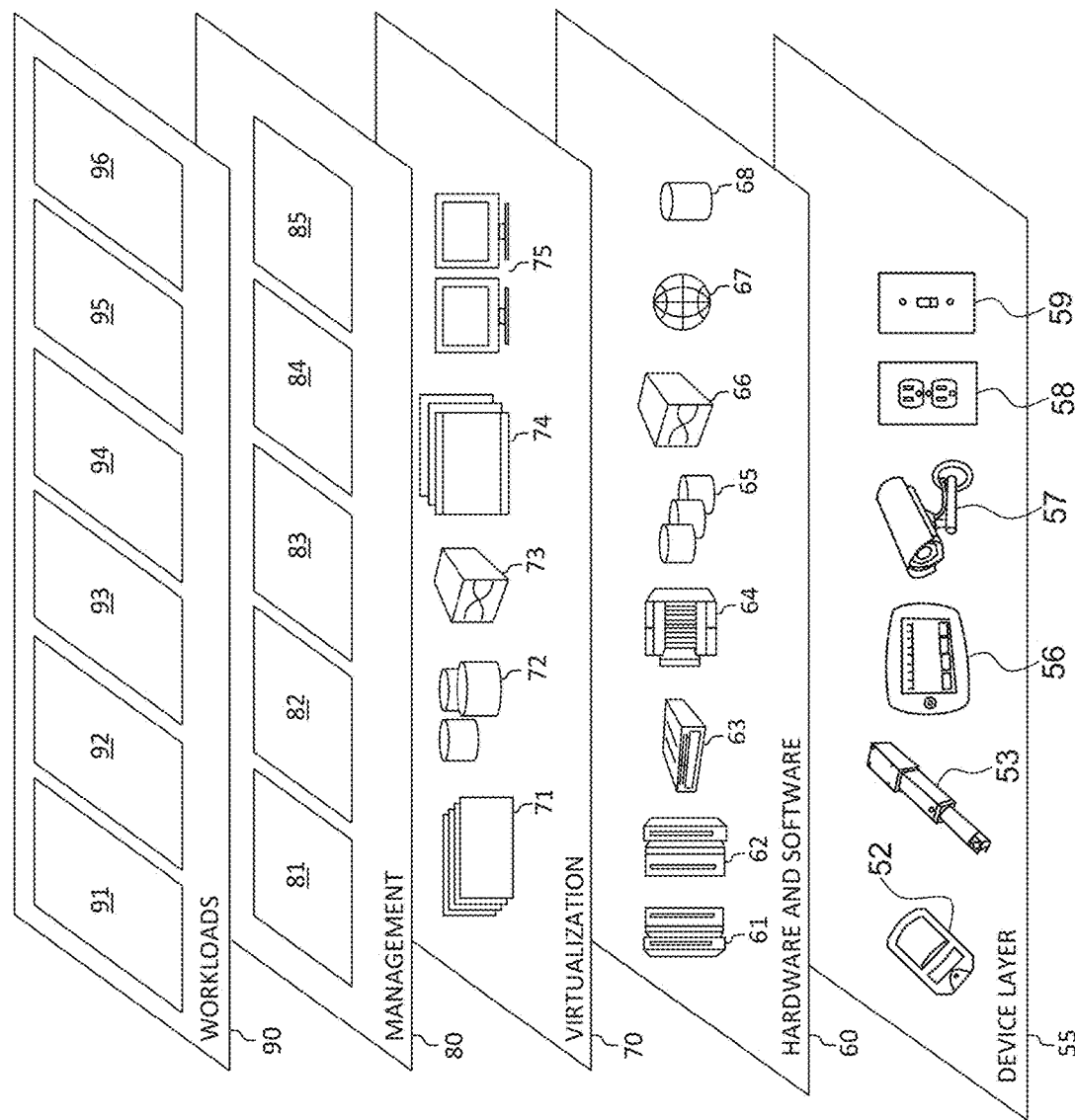
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for an electronic communication coaching service. In addition, extraction and summarization of decision workloads and functions 96 may include such operations as data analytics, data analysis, and as will be further described, notification functionality. One of ordinary skill in the art will appreciate that the workloads and functions 96 for an electronic communication coaching service may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
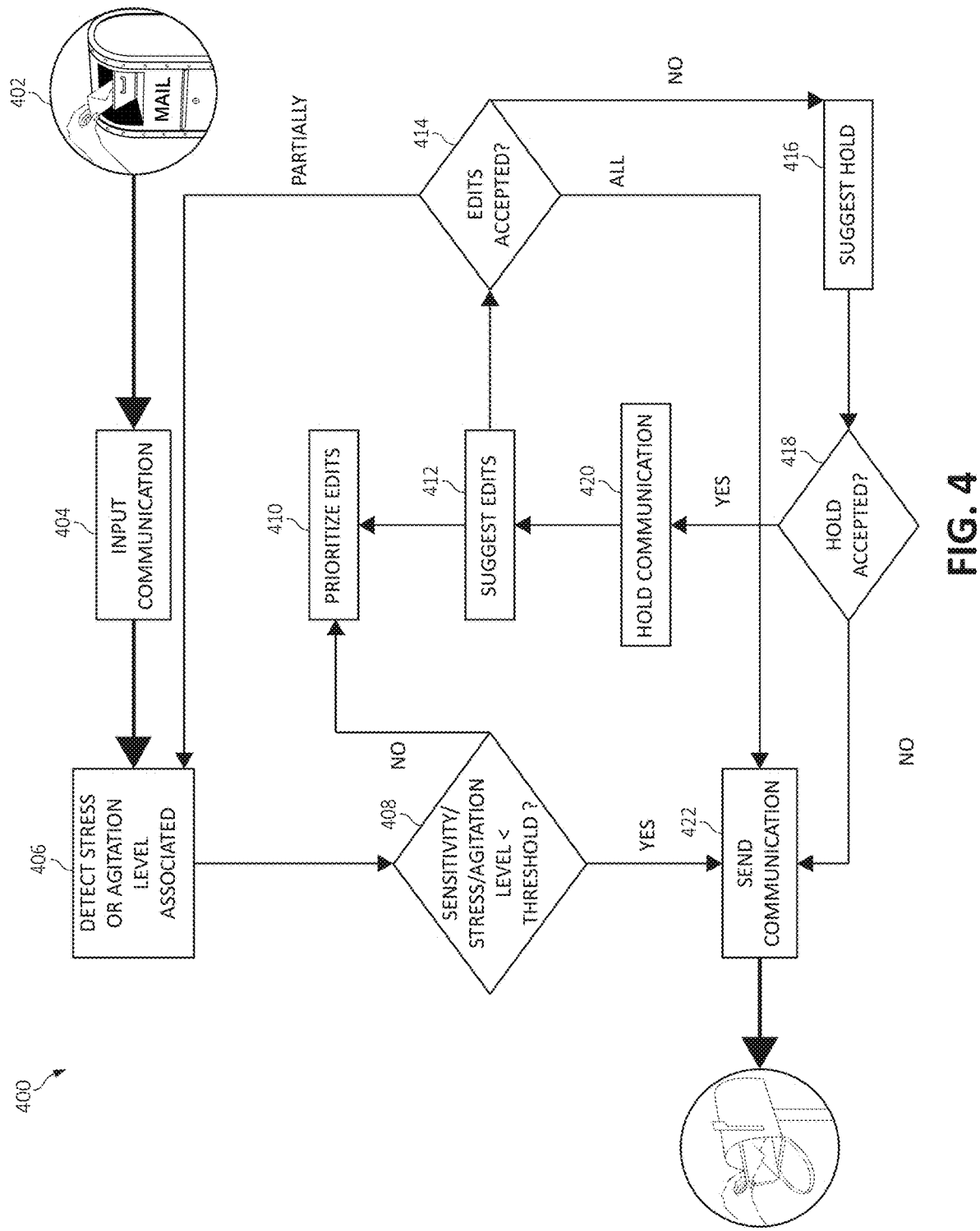
FIG. 4 is a flowchart diagram depicting an exemplary method for facilitating communications, in which various aspects of the present invention may be realized.

Turning now to FIG. 4, a method 400 for implementing an electronic communication coaching service by one or more processors is depicted, in which various aspects of the illustrated embodiments may be implemented. The functionality 400 may be implemented as a method executed as instructions on a machine, where the instructions are included on at least one computer readable medium or one non-transitory machine-readable storage medium. That is, each of the functional blocks 400 may be implemented in hardware and/or software, such as by the computer/server 12 (FIG. 1), and/or the workloads layer 90 (FIG. 3).

The functionality 400 may start with a user 402 creating an electronic communication (e.g., input communication) such as, for example, an email, as in block 404. A tone, sentiment, emotional state of the user 402 may be detected in the communication (e.g., a stress level, agitation level associated with the email), as in block 406. A determination operation is performed to determine if a sensitivity level, a stress level, an agitation level or combination thereof is less than a predetermined threshold, as in decision step 408. If no at decision step 408, one or more suggestive corrective actions to the communication may be prioritized (e.g., prioritize edits), as in block 410. The one or more suggestive corrective actions to the communication may be suggested to the user 402 (e.g., suggest edits), as in block 412. A determination operation is performed to determine if the one or more suggestive corrective actions to the communication are accepted (e.g., edits accepted?), as in decision step 414.

If no at decision step 414, a delay in sending the communication for a selected period of time may be suggested, as in block 416. If the hold is accepted at decision step 418, the communication message is held (e.g., delayed in sending), as in block 420, and the method 400 moves back to block 412. Returning to decision step 414, if each of the suggested edits are accepted (e.g., "all accepted"), the method 400 moves to block 422 and the communication message may be sent, as in block 422. Alternatively, if only a partial amount (e.g., less than a defined percentage of acceptance level threshold) of the suggested edits are accepted at decision step 414, the method 400 may return to block 406 for further analysis.

Returning to decision step 408, if the sensitivity level, the stress level, the agitation level or combination thereof is less than a predetermined threshold, the communication message may be sent, as in block 422.

Figure 5:
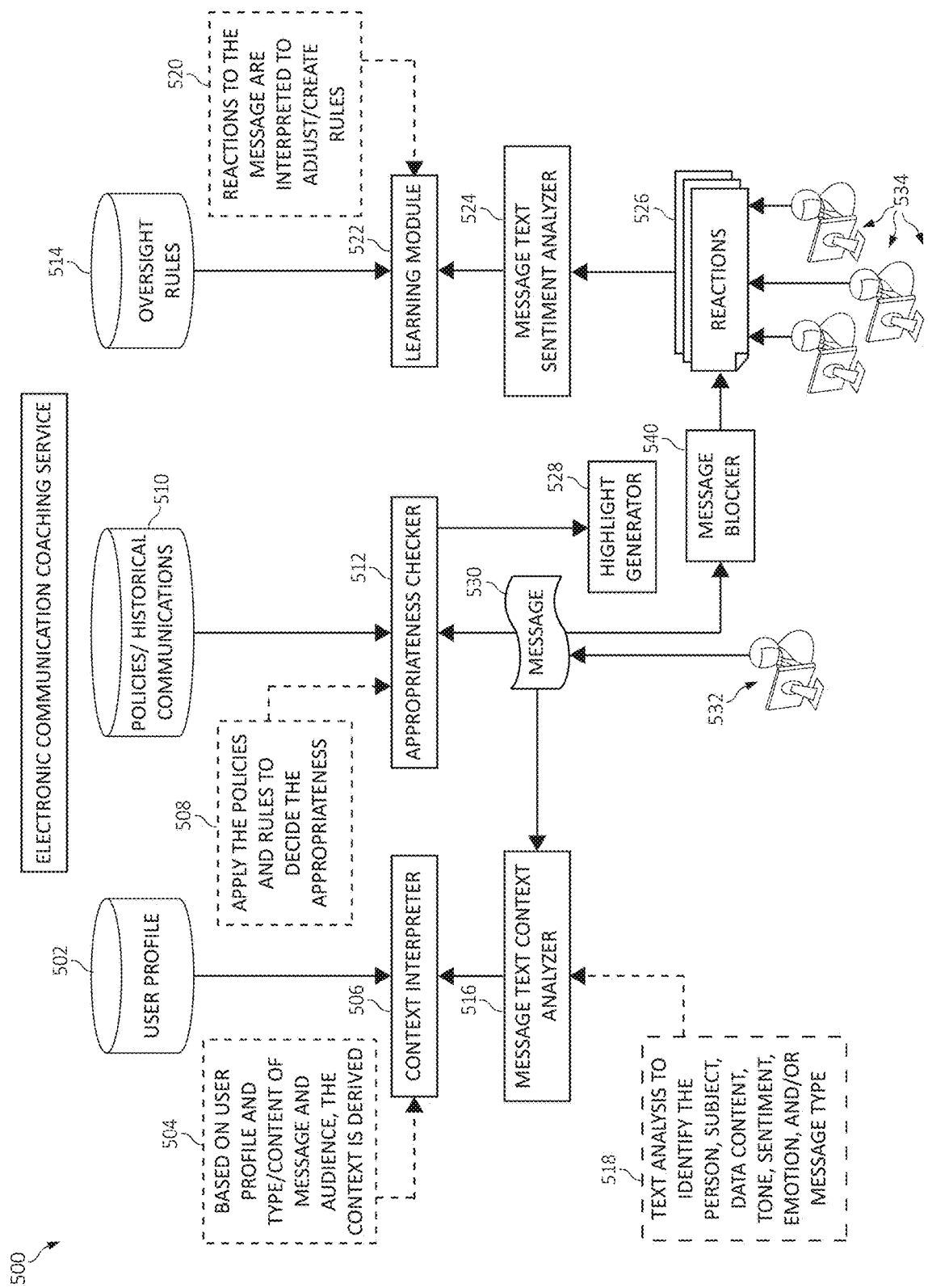
FIG. 5 is a block/flow diagram illustrating certain aspects of functionality according to the present invention.

In view of the method 400 of FIG. 4, consider, as an illustration of exemplary functional blocks to accomplish various purposes of the present invention, FIG. 5, following. FIG. 5 illustrates these exemplary functional blocks 500 and associated notes on specific functionality (as denoted by the doted boxes). Each of the functional blocks 500 may be implemented in hardware and/or software, such as by the computer/server 12 (FIG. 1), and/or the workloads layer 90 (FIG. 3).

In the depicted embodiment, a user profile block 502 is stored in a database containing various information such as user biographical information, associates of the user (friends, family, colleagues, or employment relationships, for example), geographical location of the user, a list of data content deemed appropriate and inappropriate (e.g., which may be learned over time via a machine learning algorithm), and a potential host of additional information. As one of ordinary skill in the art will appreciate, the various user profile information may be obtained from a wide variety of sources, be it a local source, profiles associated with a particular social media application, employment information, previous communications (e.g., emails) and the like. Accordingly, these sources making up the user profile 502 may be spread throughout the Internet as part of a distributed computing and/or cloud environment as may other portions of the blocks 500 of functionality. Based on the user profile and the type of communication and audience, for example, the various contextual factors may then be identified and/or derived (shown by box 504).

A context interpreter 506 function is shown receiving information from a message text context analyzer 516. The message text context analyzer 516, among other functionality, uses text analysis of the communications in question to identify the person, subject, message type, or other information pertinent to the analysis in a particular situation. As shown the information from the user profile 502, as well as data from the message text context analyzer 516 is given to the context interpreter 506, which in turn provides information to the appropriateness checker 512. For example, the message text context analyzer 516 may identifying one or more keywords, phrases, text formats, text fonts, or a combination thereof having a possible negative impact upon the third party.

In view of the functionality of the appropriateness checker 512, a variety of factors should be considered to evaluate the "appropriateness," such as, and not limited to, (1) the author's relationship to the topic/subject (e.g., a specific employee talking about a company product, a person sending an email to a friend, and so forth), (2) the platform where the message is posted (audience) or, for example, relationship to the media or listeners, (3) the time and place information, (4) policies, culturally and socially acceptable communication standards, laws applicable (such as employment policies, laws applicable to a certain geographical location, or other applicable standards), and (5) offensive communication that may be considered by the system to never be appropriate at any time or place, irrespective of the user's role, position, etc.

As shown in database block 510, these aforementioned policies, sender/recipient relationships, historical communications, and other related information may be provided from a variety of sources (local, government, media, social media networks, search engines, servers, cloud computing services, and a host of other sources, for example) to the appropriateness checker 512. More specifically, the appropriateness checker 512 may interpret an appropriateness of a communication prior to a user 532 sending the message 530 to another party 534 according to a plurality of identified contextual factors. In one aspect, by way of example only, the interpreting the appropriateness of the communications based on the plurality of identified contextual factors further includes interpreting a tone, a sentiment, emotion (e.g., levels of stress, frustration, anger, annoyance), keywords, phrases, text font, punctuation, and a sensitively level, relationship status, communication history, or a combination thereof between the user and another party 534.

For example, the appropriateness checker 512 may detect a stress level, agitation level, and/or other level of negative emotion according to the content of the electronic communication, such as words, phrases, or sentences in an email, by searching for inappropriate keywords and expressions based on sender/recipient profile, relationship between sender and recipient and history of communications between the user 532 (e.g., sender) and another party 534 (e.g., recipient).

The communication may be analyzed (here message 530) by the appropriateness checker 512, which examines the communication in view of all of the information gathered through the previously described blocks 502, 506, and 516. In one aspect, the appropriateness checker 512 may be built into an email or other communication software, and automatically check all outgoing communication without any user intervention. Message 530 may include an email, or a reply to an existing email thread, for example. The appropriateness checker 512 may then apply the policies, sender/recipient profile, sender/recipient relationship, historical communications, and/or rules in view of the identified contextual factors to determine the particular appropriateness, which is then compared against a predetermined threshold for acceptable appropriateness.

If the calculated appropriateness is less than the threshold value, the highlight generator block 528 then functions to highlight the identified inappropriate content of the communication (e.g., highlights words, phrases, sentences in the email). As an additional operation, for example, the highlight generator block 528 may notify the user 532 of the inappropriate text. The highlight generator 528 may also use the collected policies, sender/recipient profile, sender/recipient relationship, historical communications, and/or rules to generate one or more rationales for the alert, so that the user may make an informed decision.

The highlight generator 528 sends the notification, including the highlighted portions of the inappropriate data content, to the user and manages the response. In one aspect, highlight generator 528, in association with the appropriateness checker 512, may suggest one or more corrective actions (e.g., censor or edits) to the communication and also suggests a delay in sending the communication for a selected period of time to implement one or more suggestive corrective actions to the communication.

If the user decides to accept the delay, the message blocker 540 may hold/restrict sending the communication for the selected period of time. The appropriateness checker 512 may perform, under direction of one or more processor devices, an auto-correction, auto-censor, and/or modification operation to apply the one or more suggestive corrective actions.

In one aspect, if the calculated appropriateness is less than the threshold value and within a defined range of values indicative of extremely inappropriate, the message blocker 540 may block the message.

In an additional aspect, the appropriateness checker 512 may also detect and determine an intended recipient for receiving the communication. If an alternative email is selected that is not associated with the intended recipient, the message blocker 540 may hold/restrict sending the communication for the selected period of time to ensure the recipient is the correct and intended recipient. In short, the message blocker 540 may intercept and restrict delivery of the communication upon determining from the communication that the communication is being sent or about to be sent to a wrong or unintended user.

If the user decides to continue with the communication without accepting the suggested delay, the message may be sent and the learning module 522 will obtain feedback from the user. The user then provides feedback, which may be combined with other user feedback of the communications (or similar communications) from users 534 to form reactions 526.

The reactions 526 may be provided to a message text sentiment analyzer block 524, which then analyzes the sentiment context from the various reactions 526, and provides this information to the learning module 522. The learning module implements a machine learning algorithm as previously described, where reactions to the communication are interpreted to adjust the parameters associated with the rules (shown by box 520), update each user's profile, add current communications to the historical communications, and further use the reactions to enhance the accuracy for determining the calculated appropriateness. In one embodiment, the learning module 522 is a contextual appropriateness rule learning engine, which may infer new rules or update the weightings associated with the parameters of existing rules. Techniques such as decision tree learning, or neural networks (as one of ordinary skill in the art will appreciate) may be used to infer new rules or update the weightings associated with the parameters of existing rules. The interpretations are then provided to the oversight rules database block 514, which are then fed back to the appropriateness checker 512 as shown.

In view of the foregoing blocks of functionality 500, the following specific examples of functionality may be implemented. First, the relationship between the subject and object and the topic (e.g., employee-company product, competitor-rival behavior, parent-child's photo, citizen-judge, citizen-leader, leader-foreign policy, journalist-incident) may be identified. The profile(s) of the author of the communication may then undergo analysis. Based on the initial analysis, various relationships may be identified. Some relationships allow all types of comments/opinions. Other relationships may allow certain types of comments, some relationships may allow for certain comments on specific platforms/media, while some relationships are completely inappropriate for any communication in any media. Moreover, the profile of each user may also include physiological, psychological, or other biometric data to learn specific details and characteristics of each user for detecting a level of tone and sentiment in each communication. In one aspect, the sentiment may represent a tone of the user and an emotional state of the user (e.g., polite, aggressive, agitated, frustrated, stressed, neutral, happy, sad, angry, etc.). A specific emotional state (e.g., polite, aggressive, agitated, frustrated, stressed, neutral, happy, sad, angry, etc.) may be described as a sentiment type.

The particular relationship between the sender, recipient, the broader audience and the topic of the message, and the nature (e.g., tone, sentiment (e.g., emotional state such as, for example, a stress or agitation level etc.) of the message/comment—negative/positive, factual, insensitive, inappropriate, derogatory, vulgar, inflammatory, judgmental, accusing, defamatory, controversial, unwarranted, (typical sentiment analysis) may be identified. As a next step, the type of media/audience, such as public media, private emails, inside organization forum, and other relationships may be identified. These relationships may be partially or wholly identified from a study of the user's profile. The appropriateness of text content of a communication may then be verified using country-specific, organization-specific rules, general policy rules, social etiquettes rules, which take into consideration the sender/recipient profiles, sender/recipient relationships, historical communications, and other factors previously identified. The appropriateness is then verified using other context specific rules. The sum total of the foregoing analysis is then compared against the aforementioned threshold and the identified, inappropriate content of the communication may be highlighted and an alert notification given where and when warranted. Feedback is collected and searched from the user and others' reactions, and sentiment analysis is performed on the collected feedback. The applicable rules are then adjusted, or new rules are derived, based upon the collected feedback.

Consider the following as examples of the operations of the present invention. Suppose an email is created by a supervisor "A" with the intention of sending the communication to another supervisor "B" with concerns about an employee "C" and, further assume the email contains the words "X, Y, and Z", where X, Y, and Z are identified as inappropriate content about employee "C." Assume, also supervisor "A" composes the email with a detectible level of anger, frustration, or stress such as, for example, by including words such as "I'm so angry," or "I've had it," or "This behavior must stop or I quit."

The relationship between the sender (e.g., supervisor "A") and the recipient are to be interpreted by the system. However, the system of the present invention identifies from the context of the email that sender (e.g., supervisor "A") mistakenly has listed as the "recipient" of the email the actual employee (employee "C") of whom the supervisor "A" is discussing as opposed to the intended recipient (supervisor "B"). Thus, the electronic communication coaching service, as describe herein, may identify and interpret the sentiment (e.g., angry, frustrated, and/or stressed) of the communication, the relationship between supervisor "A" and employee "C," the historical communications between supervisor "A" and employee "C" (e.g., employee C previously sent supervisor "A" an email discussing all the reasons why supervisor "A" is an inefficient leader), and/or identify and interpret that the words X, Y, and Z are inappropriate/inflammatory to employee "C" given the contextual factors.

In one embodiment, the last component to be analyzed may also be the logistical context of the remark, or, for example, whether the remark has been made in a private one-to-one communication (email/text messages), one-to-many but within a limited circle (friends circle, restricted forums, group emails, closed meetings, selected investors, conference calls), or open communications (social media, open blogs, social network broadcasts, public web sites, public platforms, press/media conferences, newspapers/magazines, etc.).

Supervisor "A" may be notified that their communication is potentially inappropriate/offensive given the context described in this example. The notification, for example, may include a message "Alert. It is detected that you have inappropriate content of X, Y, and Z about employee "C." You have mistakenly listed employee "C" as the recipient of the email as opposed to supervisor "B." Here is a list of corrective actions you may take to resolve the concern: 1) change the recipient from employee "C" to supervisor "B," or 2) delete or edit the words X, Y, and Z." In one aspect, the notification may be one of a variety of notification means such as an alert, a pop-up window over the email, a text message to an approved Internet of Things ("IoT") device (e.g., a smartwatch that the user may be known to be wearing) and/or any other defined notification according to user preferences.

The electronic communication coaching service may request a delay in sending the communication and/or automatically delay/restrict sending the communication for a selected period of time. The delay in sending the email may enable supervisor "A" to correct the inappropriate content. In one aspect, the electronic communication coaching service may be enabled, under direction of one or more processor devices, to bypass the request for delay, automatically restrict the delivery of the email, and automatically implement the one or more corrective actions such as, for example, automatically censor/edit the inappropriate contact or change the intended recipient. The email may be sent to the appropriate recipient (e.g., supervisor "B") upon correcting the inappropriate/offensive content and/or changing the email address for the recipient from employee "C" to supervisor "B."

Thus, the electronic communication coaching service provides guidance to correct an electronic communication and/or holds the electronic communication before sending the electronic communication. Before sending the electronic communication the sentiment (e.g., tone, emotional level such as a stress level, agitation level, etc.) of the electronic communication may be searched for inappropriate content (e.g., words, phrases, sentences, etc.) based on sender/recipient profile, relationship between sender and recipient and history of communication. The sentiment of the communications may be interpreted to be positive (appreciative), negative (insensitive, inflammatory, accusations, defaming, allegations, complaint), sarcasm, tones of racism, sexism, blasphemy, and so forth.

The electronic communication coaching service may suggest a correction in the electronic communication by highlighting content such as text, images, expressions, and/or mistaken recipients not intended for being a recipient of the communication, and checking if the sentiment (e.g., stress level, frustration level) is above or below a threshold before sending. The electronic communication coaching service may also suggest holding the email for a selected period of time for implementing one or more corrective actions.

Figure 6:
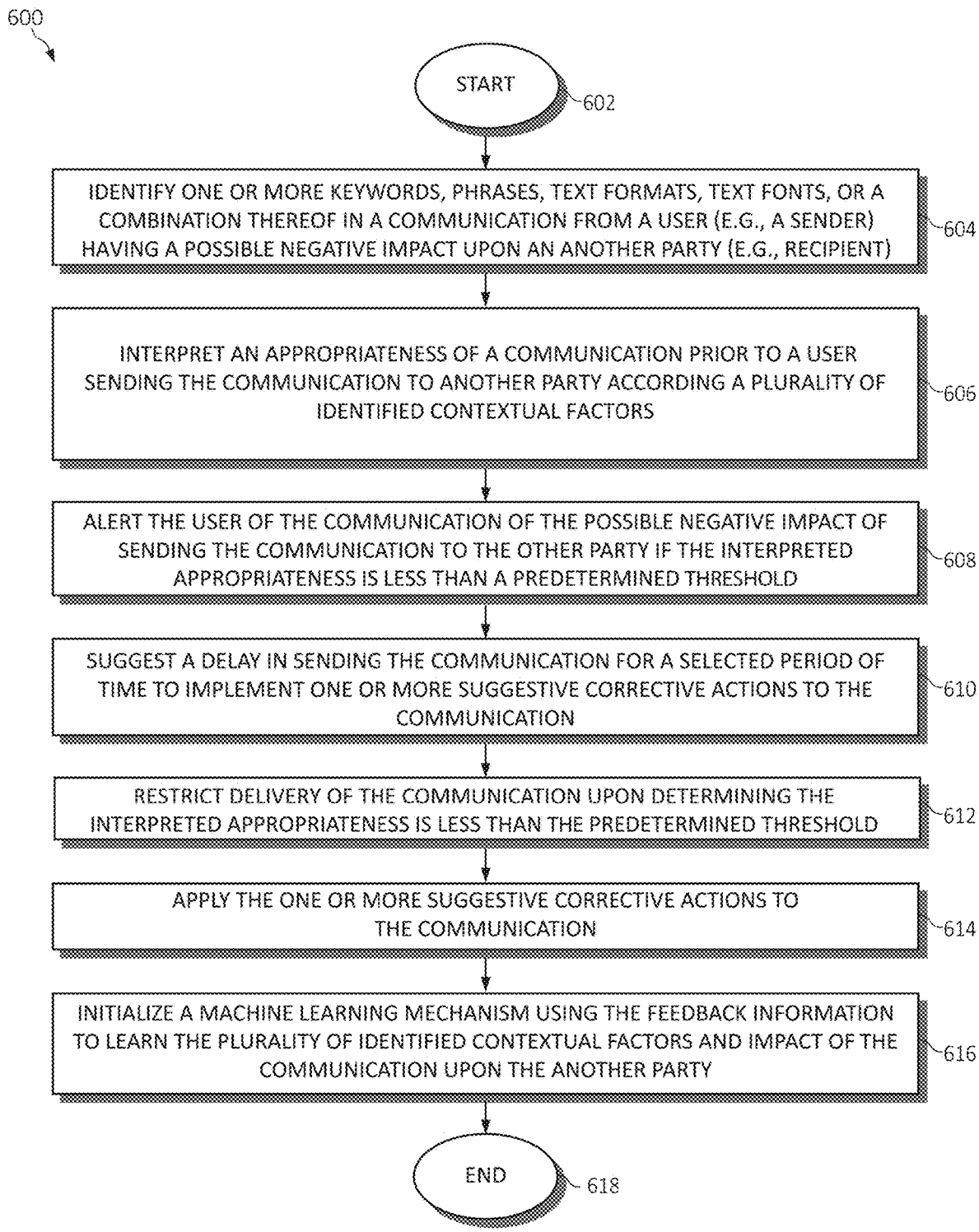
FIG. 6 is a flowchart diagram depicting an additional exemplary method for using an electronic communication coaching service, again in which various aspects of the present invention may be realized.

Turning now to FIG. 6, a method 600 for implementing an electronic communication coaching service by one or more processors is depicted. The functionality 600 may be implemented as a method executed as instructions on a machine, where the instructions are included on at least one computer readable medium or one non-transitory machine-readable storage medium. That is, each of the functional blocks 400 may be implemented in hardware and/or software, such as by the computer/server 12 (FIG. 1), and/or the workloads layer 90 (FIG. 3).

The functionality 600 may start in block 602. One or more keywords, phrases, text formats, text fonts, or a combination thereof having a possible negative impact upon another party for a communication message may be identified, as in block 604. An appropriateness of a communication (e.g., content of an email message) may be cognitively interpreted prior to a user sending the communication to another party according a plurality of identified contextual factors, as in block 606. The operation of cognitively interpreting the appropriateness of the communications based on the plurality of identified contextual factors further includes, for example, interpreting a tone, a sentiment, emotion (e.g., anger, anxiety, agitation, stress, etc.) keywords, phrases, text font, punctuation ones of the contextual factors in view of the communications and also determining a sensitively level, relationship status, communication history, or a combination thereof between the user and the another party.

The user may be alerted to a possible negative impact of sending the communication to the other party if the interpreted appropriateness is less than a predetermined threshold (or alternatively if the interpreted appropriateness is equal to and/or greater than a predetermined threshold), as in block 608. A delay in sending the communication may be suggested for a selected period of time to give the user time to implement one or more suggestive corrective actions to the communication, as in block 610. Delivery of the communication may be restricted upon determining the interpreted appropriateness is less than a predetermined threshold, as in block 612. The one or more suggestive corrective actions (e.g., auto-censor or auto correct the inappropriate content) may be applied to the communication, as in block 614. A machine learning mechanism or algorithm may be initialized using collected feedback information to learn the plurality of identified contextual factors and impact of the communication upon the another party, as in block 616. The functionality of method 600 may end, as in block 618.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for implementing an electronic communication coaching service by a processor, comprising:

interpreting an appropriateness of a communication prior to a user sending the communication to another party according to a plurality of identified contextual factors, wherein the appropriateness of the communication is contextually interpreted based on particular content within the communication being determined as appropriate dependent upon a relationship status and a communication history having similar content to the particular content with an identified recipient of the communication comprising the another party;

alerting the user to a possible negative impact of sending the communication to the another party if the interpreted appropriateness is determined to correspond to a value within a first range of values less than a predetermined threshold, wherein alerting the user includes highlighting the particular content, corresponding to the value, within the communication and suggesting one or more corrective actions inclusive of one or more changes to the particular content; and responsive to determining the interpreted appropriateness of the communication corresponds to the value within the first range of values less than the predetermined threshold, suggesting a delay in sending the communication for a selected period of time to implement the one or more suggestive corrective actions to the communication; wherein, when the interpreted appropriateness is determined to correspond to a second value within a second range of values, lower than the first range of values, below the predetermined threshold indicative of especially inappropriate content, the communication is automatically restricted from being delivered to the another party.

2. The method of claim 1, wherein cognitively interpreting the appropriateness of the communications based on the plurality of identified contextual factors further includes interpreting a tone, a sentiment, emotion, keywords, phrases, text font, punctuation ones of the contextual factors in view of the communications.

3. The method of claim 1, wherein interpreting the appropriateness of the communications based on the plurality of identified contextual factors further includes determining a sensitively level between the user and the another party.

4. The method of claim 1, further including identifying one or more keywords, phrases, text formats, text fonts, or a combination thereof having the possible negative impact upon the another party.

5. The method of claim 1, further including applying the one or more suggestive corrective actions to the communication.

6. The method of claim 1, further including initializing a machine learning mechanism using feedback information to learn the plurality of identified contextual factors and impact of the communication upon the another party.

7. A system for implementing an electronic communication coaching service, comprising:

one or more computers with executable instructions that when executed cause the system to:

interpret an appropriateness of a communication prior to a user sending the communication to another party according to a plurality of identified contextual factors, wherein the appropriateness of the communication is contextually interpreted based on particular content within the communication being determined as appropriate dependent upon a relationship status and a communication history having similar content to the particular content with an identified recipient of the communication comprising the another party;

alert the user to a possible negative impact of sending the communication to the another party if the interpreted appropriateness is determined to correspond to a value within a first range of values less than a predetermined threshold, wherein alerting the user includes highlighting the articular content, corresponding to the value, within the communication and suggesting one or more corrective actions inclusive of one or more changes to the particular content; and responsive to determining the interpreted appropriateness of the communication corresponds to the value within the first range of values less than the predetermined threshold, suggest a delay in sending the communication for a selected period of time to implement the one or more suggestive corrective actions to the communication; wherein, when the interpreted appropriateness is determined to correspond to a second value within a second range of values, lower than the first range of values, below the predetermined threshold indicative of especially inappropriate content, the communication is automatically restricted from being delivered to the another party.

8. The system of claim 7, wherein, pursuant to interpreting the appropriateness of the communications based on the plurality of identified contextual factors, the executable instructions further interpret a tone, a sentiment, an emotional state, keywords, phrases, text font, punctuation ones of the contextual factors in view of the communication.

9. The system of claim 7, wherein, pursuant to interpreting the appropriateness of the communications based on the plurality of identified contextual factors, the executable instructions further determine a sensitively level between the user and the another party.

10. The system of claim 7, wherein the executable instructions further identify one or more keywords, phrases, text formats, text fonts, or a combination thereof having the possible negative impact upon the another party.

11. The system of claim 7, wherein the executable instructions further apply the one or more suggestive corrective actions to the communication.

12. The system of claim 7, wherein the executable instructions further initialize a machine learning mechanism using feedback information to learn the plurality of identified contextual factors and impact of the communication upon the another party.

13. A computer program product for implementing an electronic communication coaching service by a processor, the computer program product comprising a non-transitory computer-readable storage medium having computer-readable program code portions stored therein, the computer-readable program code portions comprising:

an executable portion that interprets an appropriateness of a communication prior to a user sending the communication to another party according to a plurality of identified contextual factors, wherein the appropriateness of the communication is contextually interpreted based on particular content within the communication being determined as appropriate dependent upon a relationship status and a communication history having similar content to the particular content with an identified recipient of the communication comprising the another party;

an executable portion that alerts the user to a possible negative impact of sending the communication to the another party if the interpreted appropriateness is determined to correspond to a value within a first range of values less than a predetermined threshold, wherein alerting the user includes highlighting the particular content, corresponding to the value, within the communication and suggesting one or more corrective actions inclusive of one or more changes to the particular content; and an executable portion that, responsive to determining the interpreted appropriateness of the communication corresponds to the value within the first range of values less than the predetermined threshold, suggests a delay in sending the communication for a selected period of time to implement the one or more suggestive corrective actions to the communication; wherein, when the interpreted appropriateness is determined to correspond to a second value within a second range of values, lower than the first range of values, below the predetermined threshold indicative of especially inappropriate content, the communication is automatically restricted from being delivered to the another party.

14. The computer program product of claim 13, further including an executable portion that, pursuant to interpreting the appropriateness of the communications based on the plurality of identified contextual factors, interprets a tone, a sentiment, an emotional state, keywords, phrases, text font, punctuation ones of the contextual factors in view of the communication.

15. The computer program product of claim 13, further including an executable portion that, pursuant to interpreting the appropriateness of the communications based on the plurality of identified contextual factors, determines a sensitively level between the user and the another party.

16. The computer program product of claim 13, further including an executable portion that:

identifies one or more keywords, phrases, text formats, text fonts, or a combination thereof having the possible negative impact upon the another party; and applying the one or more suggestive corrective actions to the communication.

17. The computer program product of claim 13, further including an executable portion that initializing a machine learning mechanism using feedback information to learn the plurality of identified contextual factors and impact of the communication upon the another party.

* * * * *